March 31, 1959  J. E. TAYLOR  2,880,118
VIBRATORY COATING METHOD AND APPARATUS
Filed April 19, 1956

INVENTOR.
JAMES E. TAYLOR
BY
Leonard H. King
AGENT

United States Patent Office 2,880,118
Patented Mar. 31, 1959

2,880,118

VIBRATORY COATING METHOD AND APPARATUS

James E. Taylor, Louisville, Ky.

Application April 19, 1956, Serial No. 579,292

4 Claims. (Cl. 117—201)

This invention relates to processes and apparatus for forming uniform electrically conductive coatings on electrical insulators.

In many applications for electrical insulators such as synthetic resin compositions, it is desirable that an electrically conductive surface be provided in order to eliminate the formation of electrostatic charges. For example, in electrical measuring apparatus, electrostatic charges on windows result in disturbances to sensitive meters. Accordingly, it is desirable to render the surface of the window electrically conductive so as to eliminate the cause of disturbance.

In another typical application, that of aircraft, electrostatic charging of the plastic cockpit canopy and insulating plastic surfaces covering radio and radar antennas creates electrical interferences with radio communication and radar signals. The satisfactory coating of these surfaces represents a much more difficult problem than that of the window or the meter. A particularly difficult problem is represented by the canopy. In the canopy application it is essential that the coating provide minimum reduction of light transmission, avoid optical haze effect, avoid optically distorting the pilot's vision and provide a uniform and even coating. In the copending application of Arnold S. Louis, Serial No. 340,313, entitled Method of Producing Electrically Conductive Article, now U.S. Patent 2,817,603, which is assigned to the assignee of this application, it is disclosed that by repeatedly impacting the surface of a plastic sheet with conductive material, a thin adherent layer of conductive material may be formed on the base.

In carrying out the invention coated impactors are employed. The impactors are small spherical balls which are coated with a conductive material such as finely divided graphite. The impactors are caused to repeatedly impinge on the surface of the article to be coated.

In particular it was taught that the article to be coated may be suspended in a container filled with coated polystyrene balls approximately 1 mm. in diameter, the polystyrene balls being coated with a thin layer of graphite. By subjecting the balls to a rapid random vibration of small amplitude, as for example by attaching to the container a vibrator having a motion of about 0.040" and a frequency of about 60 cycles per second, a coating of graphite is soon built up on the article being coated.

The foregoing method was felt to be quite adequate for small uniform objects such as simple meter and instrument windows or small pieces of flat sheet. However, when complex curved shapes such as aircraft canopies some six feet long by three feet wide and two feet in height were treated in accordance with this process, it was found that non-uniformity of coating resulted. Additionally for the handling of large objects, large quantities of coated impactors were required.

Briefly stated, this invention provides a vibrating bed of coated impactors, the vibrating bed being characterized by a configuration approximating that of the article to be coated and spaced therefrom by a rather short distance so that a minimum quantity of impactors is required and more efficient and uniform coating is obtained. Further it has been found advantageous to rotate the vibrating bed during the coating operation. This rotation may be continuous or periodic. The purpose of rotation being to average out the effect of differing bed "head" which, as will be explained in greater detail hereinafter, may be considered as somewhat like the effect of hydrostatic head in the solution of hydraulic problems.

Accordingly, it is an object of this invention to provide an improved process for coating insulating materials with an electrically conductive layer.

It is another object of this invention to provide an apparatus for economically coating complexed shaped insulator by vibratory means.

It is another object of this invention to provide a convenient apparatus for coating complex shaped insulator bodies.

It is an object of this invention to provide an improved vibratory means for coating electrical insulators.

It is a further object to provide a process for coating insulator bases with conductive coatings.

Still other objects, features and advantages will become apparent, or will be pointed out with particularity as the following description proceeds. In the accompanying drawings the same symbols refer to the same members in the various views.

Figure 1:
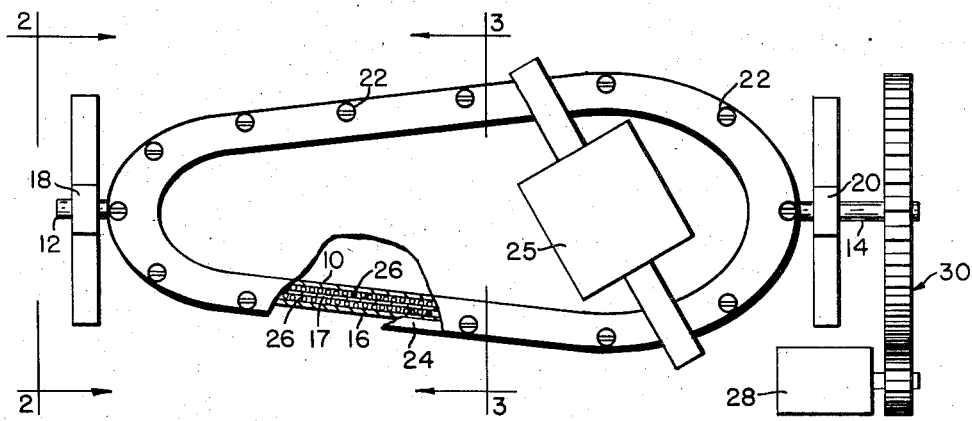
Figure 1 is a partially broken away plan view of an apparatus of this invention employed in the coating of a typical aircraft canopy.

In carrying out the coating process, it was found that the rate of transfer of the conductive coating from the bed of impactors to the base, such as a transparent acrylic panel, depends on the number of variables, among them, pressure between coating bed and panel, as influenced, for instance, by depth of bed (head), condition of the coating bed, and the direction of vibration. A number of these variables seemed to be especially important when the method was applied to uniformly coating a complex large form such as an aircraft canopy. It was found that the rate of coating is dependent on the pressure between the coating bed and the panel. Whether the pressure is due to the depth (head) of the bed in a manner analogous to hydrostatic pressure, or to pressure applied mechanically to the back of the panel and through the panel to the back of the bed appeared immaterial. It was further found for the particular vibration equipment employed that bed depths of more than two inches are needed for uniformity of coating. By this is meant the distance from the top of the bed to the area where coating is taking place or an equivalent pressure resulting from the placing of weights on a flat sheet of plastic resting on a bed of impactors. It was found that when a vibrating bed such as shown in Figure 1 was employed, an irregularly shaped object inserted in the bed was non-uniformly coated due to differences in the bed depth and in orientation of parts of the surface of the article with respect to the direction of vibration. As a first approach to eliminating the non-uniformity it was proposed that the canopy be rotated while it was being coated, thus each area would be subjected in turn to all given bed depths and each area would receive the same total treatment. However, it was found that a rectangular bed large enough to permit rotating a complete aircraft canopy would have to contain at least 1500 lbs. of coating material. This would present the problem of preparing large amounts of conditioned coated impactors and would also present a problem in effectively vibrating such a heavy bed. Especially so, since it has been found that in a vibrating bed there is a critical energy of vibration below which coating occurs at an impractically slow rate.

It was found that the size of the coating bed could be reduced by building a shell which would be similar in configuration to the object being coated and which when joined to the object would form a container confining a space a few inches thick which could be filled with the coated impactors.

Referring now to the drawings and in particular to Figure 1, there is shown the article to be coated, in this instance an aircraft canopy 10, shafts 12 and 14, attached to case 16, bearings 18 and 20 for supporting shafts 12 and 14. The case 16 and canopy 10 are bolted together by means of bolts 22. Interposed between case 16 and canopy 10 is a gasket 24.

While not essential a distinct improvement is obtained if there is interposed, between the article to be coated and the case, a screen as taught in the copending application of Daniel Herman, Serial Number 579,390, now U.S. Patent 2,825,299, entitled Vibratory Coating Apparatus, filed concurrently herewith and assigned to the assignee of this application. The cavity is filled with the coated impactors 26.

Electromagnetic vibrator 25 provides the vibratory motion.

Motor 28 rotates the case 16 through gear train 30 and shaft 14. Rotation may be continuous or periodic for the purpose of averaging out the "hydrostatic" depth effects referred to earlier.

Figure 3:
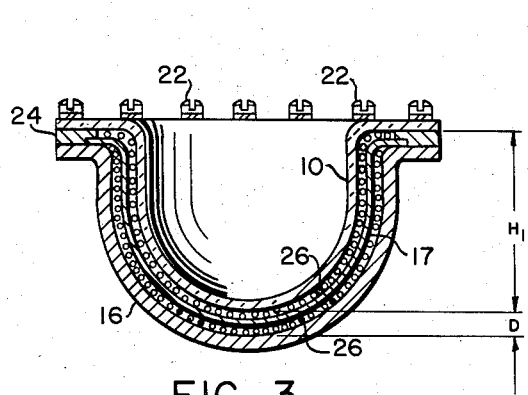
Figure 3 is a cross-section view taken along plane 3—3 of Figure 1.
Figure 4:
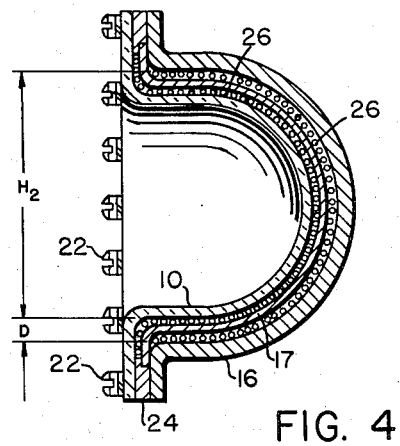
Figure 4 is the cross-section view of Figure 3 rotated 90°.
Figure 2:
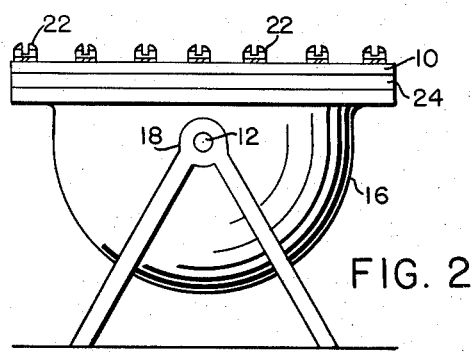
Figure 2 is an elevation view of the apparatus shown in Figure 1 taken along plane 2—2.

In Figure 3 it may be seen that the bottom of canopy 10 is subjected to a "head" of impactors $h$, the bed thickness being $d$. The uppermost portion has almost no "head" effect. By rotating 90° as in Figure 4 one wall of canopy 10 now has a working head of $h_2$. As the canopy is further rotated 90° the former uppermost portion is now subject to the full effect of head $h$. As the bed is rotated the height of the head $h$ is averaged out so that despite the complexity of the article uniform coating is obtained.

The preparation of the coated impactors is accomplished as follows:

A 55 gallon steel drum is rotated at the rate of 60 r.p.m. It is preferred that the drum be filled with baffle plates along the inner wall parallel to the axis of revolution to provide a cascading effect.

The drum is charged with 50 pounds of 1 mm. polystyrene beads (XXX grade Koppers Co. Inc.) and 0.1 pound of finely divided graphite (grade 200–10 Micronized graphite, Dixon Crucible Co.) and tumbled for 16 hours.

The resulting coated impactors 26 are placed in container 16 which is arranged to be vibrated by an electromagnetic vibrator 25 as claimed in the copending application of Arnold S. Louis, entitled Method of Producing Electrically Conductive Article, now U.S. Patent 2,817,603.

The "bed" 14 is conditioned by vibrating it approximately 4 hours after which the canopy 10 to be coated is clamped into position.

This "conditioning" of the impactors is necessary in order to avoid non-uniformity in the resulting coating.

Thus while in accordance with the statutes I have disclosed the best mode presently contemplated for carrying out the invention, employing for the purpose of illustration a specific article, I wish it understood that the invention may be employed for still other articles and that other variations and changes may be made without departing from the spirit of the invention and therefore I wish to be limited only by the scope of the appended claims.

What is claimed is:

1. An apparatus for coating an external surface of an article with a finely divided material by means of vibrated impactors coated with said finely divided material, comprising: a case member adapted to enclose the said external surface, said case member including an internal surface adapted to be positioned in a spaced face-to-face relationship with said external surface of said article, said internal surface having a contour substantially conforming to said external surface, means to seal said case member to said article so as to enclose said impactors, and means to vibrate said impactors.

2. An apparatus for coating an external surface of an article with a finely divided material by means of vibrated impactors coated with said finely divided material, comprising a case member, adapted to enclose said external surface, provided with an internal surface adapted to be positioned in a spaced face-to-face relationship with said external surface of said article, said internal surface having a contour substantially conforming to said external surface, means to seal said case member to said article so as to enclose said impactors, means to vibrate said impactors, and means to rotate said case and said article about a horizontal axis.

3. The process of coating the external surface of a synthetic resin article with an electrically conductive coating comprising the steps of coating impactors with particles of electrically conductive material, enclosing said coated impactors between said external surface and a casing having an internal configuration conforming to the shape of said external surface, introducing said resulting coated impactors between said surface to be coated and said casing, vibrating said impactors and simultaneously rotating said casing and said article about a horizontal axis.

4. The process of coating the surface of a synthetic resin article with an electrically conductive material comprising repeatedly impacting said surface with impactors coated with particles of said electrically conductive material, wherein said impactors are enclosed between said surface and a case member, the improvement comprising simultaneously rotating said article and said enclosed impactors about a horizontal axis.

References Cited in the file of this patent

UNITED STATES PATENTS

| 2,075,518 | Gettelman | Mar. 30, 1937 |
| 2,378,588 | Skehan et al. | June 19, 1945 |
| 2,817,603 | Louis | Dec. 24, 1957 |